United States Patent
Kitowski

(10) Patent No.: US 9,900,411 B2
(45) Date of Patent: Feb. 20, 2018

(54) WIRELESS ELECTRONIC COMMUNICATION DEVICES, IN PARTICULAR, MOBILE PHONES

(71) Applicant: MUDITA Sp. z o. o., Warsaw (PL)

(72) Inventor: Przemyslaw Kitowski, Gdansk (PL)

(73) Assignee: MUDITA Sp. z o. o., Warsaw (PL)

( * ) Notice: Subject to any disclaimer, the term of this patent is extended or adjusted under 35 U.S.C. 154(b) by 0 days.

(21) Appl. No.: 15/273,193

(22) Filed: Sep. 22, 2016

(65) Prior Publication Data
US 2017/0180521 A1    Jun. 22, 2017

(30) Foreign Application Priority Data
Dec. 22, 2015  (PL) .......................... 415459

(51) Int. Cl.
*H04M 1/00* (2006.01)
*H04M 1/02* (2006.01)
*H01Q 1/24* (2006.01)
*H04W 88/02* (2009.01)

(52) U.S. Cl.
CPC ............ *H04M 1/026* (2013.01); *H01Q 1/243* (2013.01); *H04W 88/02* (2013.01)

(58) Field of Classification Search
None
See application file for complete search history.

(56) References Cited

U.S. PATENT DOCUMENTS

| 2006/0192714 A1 | 8/2006 | Koyama et al. |
| 2007/0164907 A1* | 7/2007 | Gaucher ............. H01Q 1/2283 343/700 MS |
| 2014/0112511 A1 | 4/2014 | Corbin et al. |

(Continued)

FOREIGN PATENT DOCUMENTS

| CN | 1215303 A | 4/1999 |
| CN | 2405399 Y | 11/2000 |
| CN | 2468262 Y | 12/2001 |

(Continued)

OTHER PUBLICATIONS

Kaczman et al., A Single-Chip 10-Band WCDMA/HSDPA 4-Band GSM/EDGE SAW-less CMOS Receiver With DigRF 3G Interface and +90 dBm IIP2, Mar. 2009, IEEE Journal of Solid-State Circuits, vol. 44, No. 3.*

(Continued)

*Primary Examiner* — Mohammed Rachedine
(74) *Attorney, Agent, or Firm* — Masuvalley & Partners

(57) ABSTRACT

Embodiments of the present invention provide a wireless electronic communication device, in particular a mobile phone, including a transceiver, a display, a keyboard, an antenna to be used with GSM 2G 800/900/1800/1900 MHz radio frequencies. The antenna is mounted in a antenna socket inside a casing, wherein the antenna socket is made in the form of a notch at the back of the casing and vertical walls of the notch being spatially shaped, preferably along a wavy serrated line. The ratio of a circumferential length of the wavy edge line (Lz) to a length of the inner contour of the notch (L) satisfies the following relationship: Lz/L>1.4, wherein Lz is the circumferential length of the wavy edge line and L is the length of the inner contour of the antenna socket notch.

5 Claims, 5 Drawing Sheets

(56) References Cited

U.S. PATENT DOCUMENTS

2015/0148096 A1   5/2015  Chae et al.
2016/0079677 A1*  3/2016  Denis .................... B23K 9/095
                                                        228/18

FOREIGN PATENT DOCUMENTS

| CN | 1444371 A | 9/2003 |
| EP | 2330751 A1 | 6/2011 |
| FR | 2673496 A1 | 9/1992 |
| KR | 101455670 B1 | 11/2014 |
| WO | 2012118335 A2 | 9/2012 |

OTHER PUBLICATIONS

European Patent Office, Extended European Search Report dated May 30, 2017 in corresponding European Patent Application No. 15003659.8, 6 pages.

* cited by examiner

WIRELESS ELECTRONIC COMMUNICATION DEVICES, IN PARTICULAR, MOBILE PHONES

This application claims priority under 35 U.S.C. § 119 from Polish Patent Application No. P-415459, filed Dec. 22, 2015, which is hereby expressly incorporated by reference in its entirety for all purposes.

BACKGROUND OF THE DISCLOSURE

The present invention generally relates to wireless electronic communication devices and, but not by way of limitation, to mobile phones.

Wireless communication electronic devices, such as a mobile phone, or a tablet are known devices. These devices mainly consist of a transceiver, a display, a keyboard, and an antenna. Antennas used in electronic devices generate electromagnetic radiation to some extent absorbed by living tissues, which is measured by SAR factor. The radiation adversely affects the health of the user of the device.

In known wireless electronic communication devices, the antenna is positioned generally at the outer perimeter edge of the casing and is directly surrounded by the casing made of a non-conducting material, usually plastic. Because of the placement of antenna directly under the casing, at a place where the casing is in a direct contact with the face of the user, the absorption of radiation with a large absorption rate, by the user, may take place quickly. For this reason, radiation of the antenna can directly affect the health of the user when using the device, especially when making phone calls through the device.

In other known electronic communication devices the casings are made of metal, in particular aluminium. These devices use slot antennas, where the antenna is placed under the casing on one of the poles of the device and the slot allows for the emission of radiation being performed in the casing at the opposite pole. The disadvantage of this solution is that the slot is made in the casing in an area where the user holds the device during usage, which means, once again, the radiation directly reaches the user. Another disadvantage of this solution is that the placement of antenna in a metal casing will substantially deteriorate the characteristics of omnidirectional antennas. This disadvantage is further compounded by the fact that the entire device may become an antenna. This is due to the fact that the dimensions of the antenna are much smaller than the wavelength of its operating frequency. In this situation, the antenna should be treated as a radiating element close to a point source, which may be reinforced by the metal casing.

Embodiments of the present invention provide solutions for limiting the extent of absorption of radiation generated by the radio wave antennas used in electronic communication devices. The invention also relates to improving the characteristics of omnidirectional antennas working in electronic telecommunication devices.

SUMMARY OF THE INVENTION

In accordance with one aspect of the present invention, there is provided a wireless electronic communication device, in particular a mobile phone, consisting of a transceiver, a display, a keyboard, an antenna to be used with GSM 2G 800/900/1800/1900 MHz radio frequencies. The antenna is mounted in an antenna socket inside a casing, where the antenna socket is made in the form of a notch at the back of the casing, vertical walls of the notch being spatially shaped, preferably along a wavy serrated line. The feature of the notch is such that the ratio of the circumferential length of the wavy edge line Lz to the length of the inner contour of the notch L undergoes the relationship:

$$Lz/L > 1.4$$

Where

Lz—circumferential length of the wavy edge line

L—length of the inner contour of the antenna socket notch.

Preferably, the casing is made of a conductive material such as titanium, aluminium or steel.

In a preferred embodiment, the external surface of the antenna socket is lined preferably at the side of the display with a shielding layer made of a material shielding electromagnetic waves.

More preferably, the shielding layer is made of copper foil.

In accordance with a second aspect of the present invention, there is provided a wireless electronic communications device, in particular a mobile phone, consisting of a transceiver, a display, a keyboard, an antenna to be used with GSM 2G 800/900/1800/1900 MHz radio frequencies. The antenna is mounted in an antenna socket inside a casing, whereas the external surface of the antenna socket is lined with a shielding layer made of a material shielding electromagnetic waves.

Preferably, the shielding layer is lined from the side of the display.

More preferably, the shielding layer is made of copper foil.

Due to placing the antenna in a properly performed antenna socket, including the use of characteristically shaped notches in the back of the antenna socket casing, and the use of a shielding layer made of a suitable material, embodiments of the present invention enable to reduce the absorbed radiation emitted by the antenna, while allowing for a more uniform directionality of the antenna.

Reducing the radiation by the shielding layer and its placement inside the casing reduces the interaction with a metal casing. This is achieved by removing surface currents generated on an elongated edge of the antenna socket.

BRIEF DESCRIPTION OF THE DRAWINGS

The present disclosure is described in conjunction with the appended figures.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment(s) of the disclosure. It should be understood that various changes may be made in the function and arrangement of elements without departing from the spirit and scope of the invention as set forth in the appended claims.

In the following several exemplary embodiments will be described in detail:

EXAMPLE 1

Figure 4:
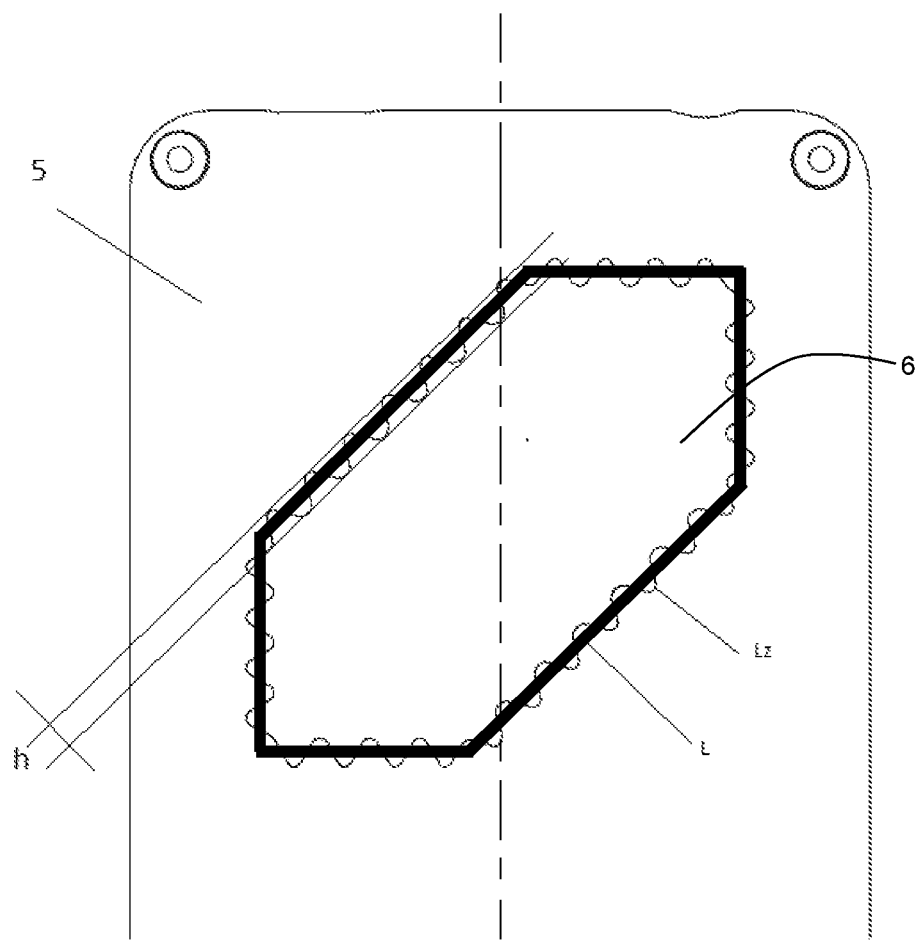
FIG. 4 illustrate an enlarged view of a notch disposed on a back of the mobile phone casing.
Figure 5:
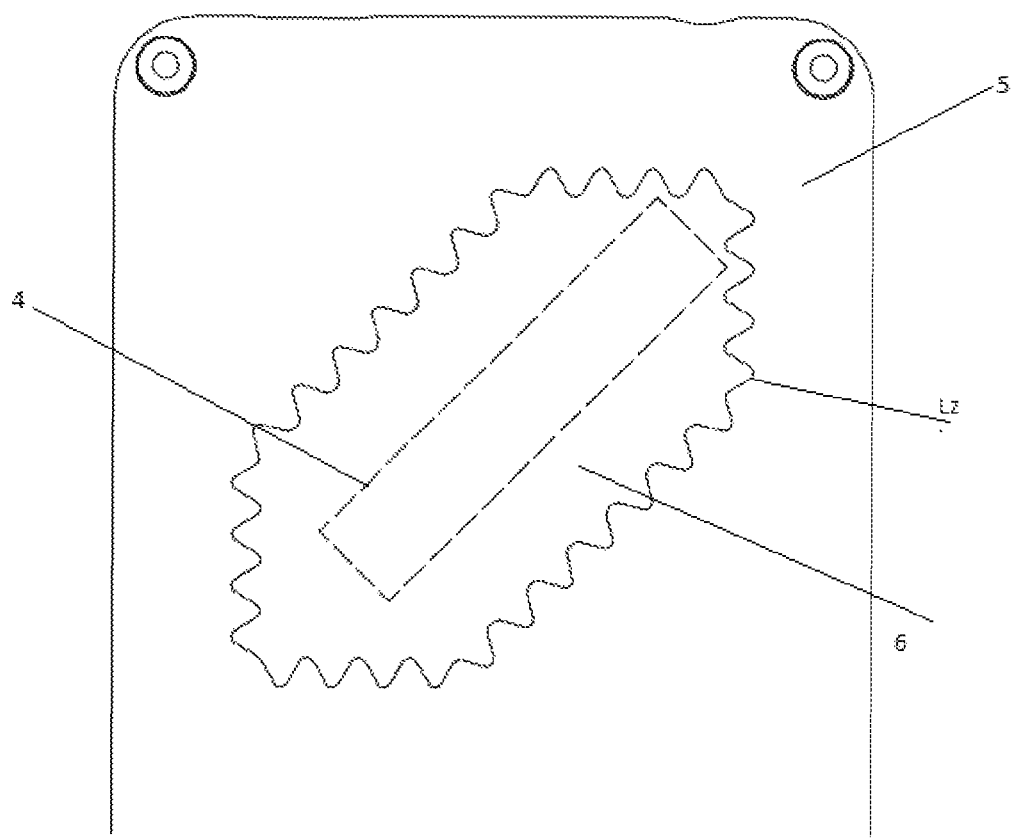
FIG. 5 illustrates an exemplary embodiment of antenna placement in an antenna socket having a notch with regular lines.

A mobile phone consists of a transceiver 1, a display 2, a keyboard 3, an antenna 4 to be used with GSM 2G 800/900/1800/1900 MHz radio frequencies. The antenna 4 is mounted in an antenna socket 6 inside a casing 5 made of titanium. The antenna socket 6 disposed on the back of the casing 5 is made in the form of a notch, whose vertical walls are spatially formed along a regular wavy serrated line. As shown in FIGS. 4 and 5, the circumferential length of the wavy edge line L is 120 mm, whereas the length of the inner contour of the notch Lz is 176 mm. The height of a recess h of a wavy line is 2 mm. The external surface of the antenna socket 6 lined from the side of the display 2 with the shielding layer 7 made of metalized fleece of TP-4 type, secured at the edges with a 38 µm self-adhesive copper foil with a conductive adhesive.

Figures 1A, 1B:
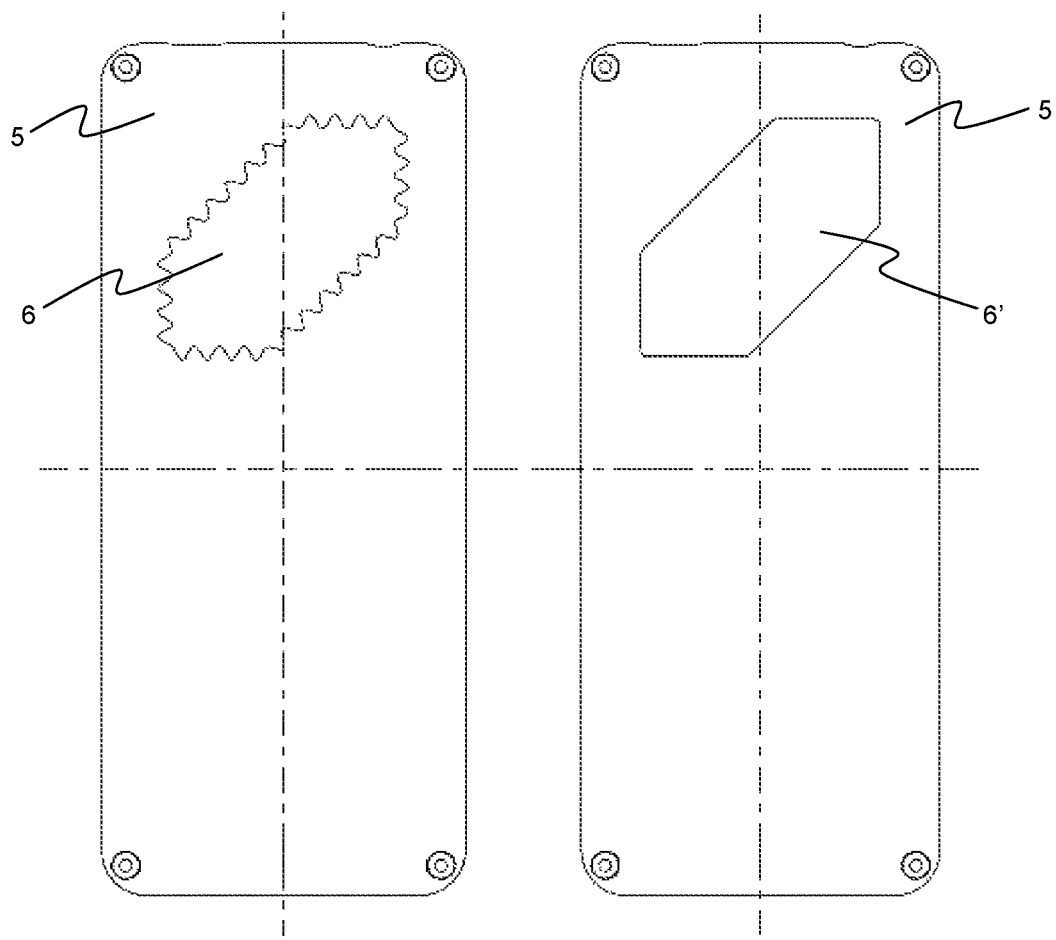
FIGS. 1A and 1B illustrate two exemplary embodiments of antenna socket notch disposed on a back of a mobile phone casing.
Figures 2, 3:
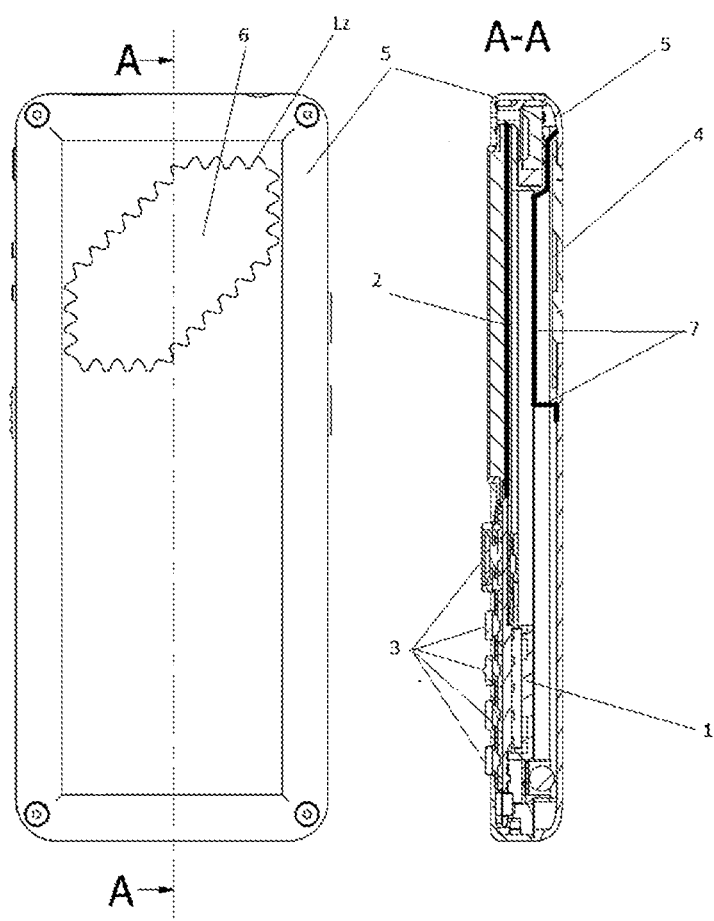
FIG. 2 illustrates an embodiment of a rear view of a mobile phone casing with a marked notch.
FIG. 3 illustrates the A-A cross-sectional view of the mobile phone casing with the marked notch of FIG. 2.

For the purpose of checking the characteristics of a directional antenna 4 in the antenna socket 6 with a notch in the casing 5, two types of notches were performed in the phone casing—a notch along a straight line and a notch according to the invention along a wavy serrated line as described above. Both of these notches are shown in FIG. 1. The measurements of the characteristics of a directional antenna were performed for selected frequencies of used radio bands. The measurements were performed in an anechoic chamber to eliminate the influence of external interference, the distance of the tested device from the reference antenna was 2.4 m.

The device tested as an antenna 4 located in a titanium phone casing 5 together with a shielding layer 7 was placed at a distance of 2.4 m from the reference (transmitting) antenna. The parameter measured was the level of the signal received by the antenna 4 placed in the tested device. The measurements were performed in an automated manner for all possible settings of the tested device. A minimum span of the signal level variation (max-min) for a window comprising 80% of all measurement points was adopted as a comparison parameter.

The results of measurements are summarized in Table I. As can be seen from Table I, for the upper frequency range of 1800 Mhz-1900 Mhz, an average improvement of 0.5 dB was achieved.

TABLE I

Results of comparative measurements of standard mobile phone and a phone with a notch along the wavy serrated line according to the invention for a minimum span of signal level variation (max-min) for a window comprising 80% of all measurement points.

| Frequency [MHz] | A phone with a notch along a straight line The range of signal changes [dB] | A phone with a notch along a wavy serrated line of the Example 1 The range of signal changes [dB] |
|---|---|---|
| 800 | 9.26 | 6.46 |
| 950 | 6.82 | 6.98 |
| 1800 | 7.46 | 6.89 |
| 1950 | 7.35 | 6.90 |

EXAMPLE 2

Figure 6:
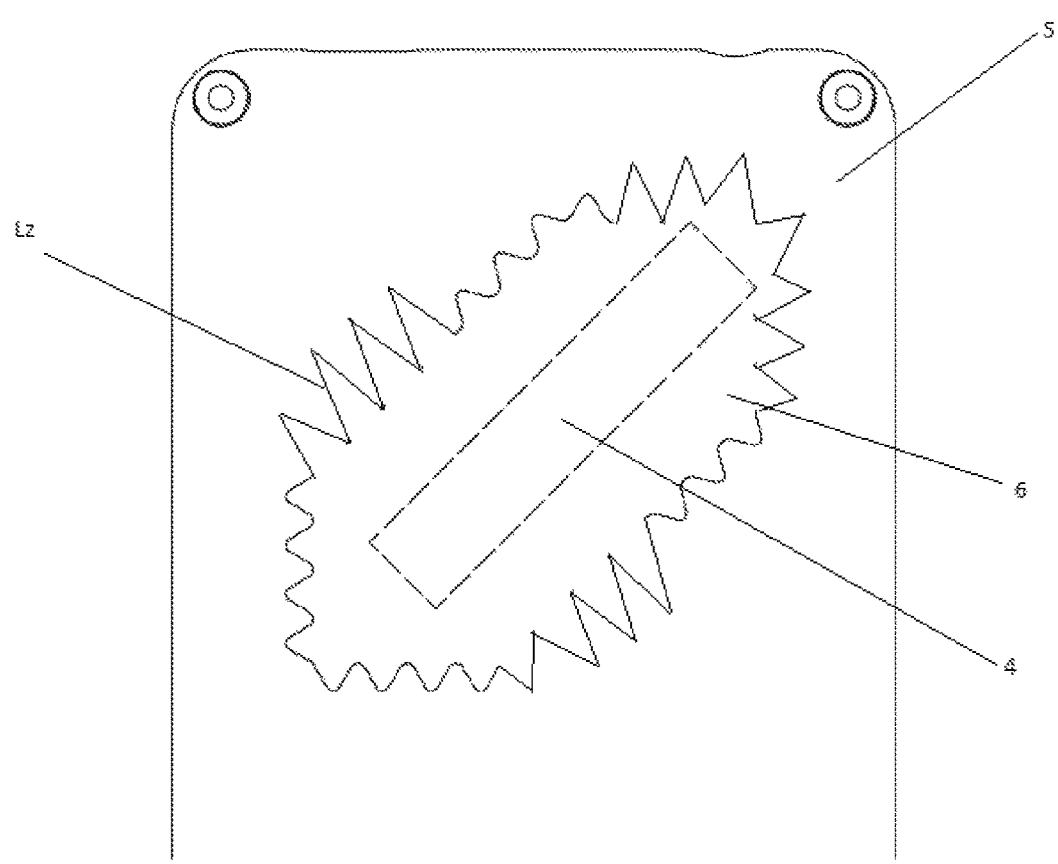
FIG. 6 illustrates an exemplary embodiment of antenna placement in an antenna socket having a notch with irregular lines.

The phone is manufactured as described in Example 1, however, the casing 5 is made of steel and the antenna socket 6 disposed on the back of the casing 5 is made in the form of a notch whose vertical walls are spatially formed along an irregular wavy serrated line, as shown in FIG. 6. The height of a recess h is a minimum of 2 mm. The circumferential length of an irregular wavy edge line Lz is 232 mm, whereas the length of the inner contour of the notch L is 120 mm.

EXAMPLE 3

A mobile phone consists of a transceiver 1, a display 2, a keyboard 3, an antenna 4 to be used with GSM 2G 800/900/1800/1900 MHz radio frequencies. The antenna 4 is mounted in the antenna socket 6 in the casing 5, whereas the external surface of the antenna socket 6 is lined from the side of the display 2 with a shielding layer 7 made of copper foil.

While the principles of the disclosure have been described above in connection with specific apparatuses, it is to be clearly understood that this description is made only by way of example and not as limitation on the scope of the invention.

What is claimed is:

1. A wireless electronic communications device, in particular a mobile phone, comprising a transceiver, a display, a keyboard, and an antenna to be used with GSM 2G 800/900/1800/1900 MHz radio frequencies, wherein the antenna is mounted in an antenna socket inside a casing, wherein the antenna socket is made in the form of a notch at the back of the casing and vertical walls of the notch being spatially shaped, preferably along a wavy serrated line, wherein the ratio of a circumferential length of the wavy edge line (Lz) to a length of an inner contour of the notch (L) undergoes the relationship:

$Lz/L > 1.4$, and wherein:
Lz is the circumferential length of the wavy edge line, and
L is the length of the inner contour of the antenna socket notch.

2. The wireless electronic communications device, according to claim 1, wherein the casing is made of a conductive material.

3. The wireless electronic communications device, according to claim 1, wherein an external surface of the antenna socket is lined preferably at one side of the display with a shielding layer made of a material shielding electromagnetic waves.

4. The wireless electronic communications device according to claim 3, wherein the shielding layer is made of copper foil.

5. The wireless electronic communications device according to claim 2, wherein the casing is made of titanium or aluminium or steel.

\* \* \* \* \*